(12) United States Patent
Russell et al.

(10) Patent No.: US 7,473,285 B2
(45) Date of Patent: Jan. 6, 2009

(54) METHOD OF CONVERTING AGRICULTURAL WASTE TO LIQUID FUEL CELL AND ASSOCIATED APPARATUS

(75) Inventors: Richard W. Russell, Morgantown, WV (US); Alfred H. Stiller, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 484 days.

(21) Appl. No.: 10/239,256

(22) PCT Filed: Mar. 23, 2001

(86) PCT No.: PCT/US01/09412

§ 371 (c)(1),
(2), (4) Date: Feb. 11, 2003

(87) PCT Pub. No.: WO01/70917

PCT Pub. Date: Sep. 27, 2001

(65) Prior Publication Data

US 2003/0221361 A1    Dec. 4, 2003

Related U.S. Application Data

(60) Provisional application No. 60/191,531, filed on Mar. 23, 2000.

(51) Int. Cl.
*C10L 5/00* (2006.01)
(52) U.S. Cl. .......................... 44/605; 44/628; 585/240
(58) Field of Classification Search .................. 44/605, 44/629, 628; 585/240, 242
See application file for complete search history.

(56) References Cited

U.S. PATENT DOCUMENTS 4,618,736 A * 10/1986 Benn et al. ................. 585/240

OTHER PUBLICATIONS

Zhang et al, Thermochemical Conversion of Swine Manure to Produce and Reduce Waste. Dec. 1999, Illinois Council on Food and Agricultural Research, pp. 1-47.*

* cited by examiner

*Primary Examiner*—Cephia D Toomer
(74) *Attorney, Agent, or Firm*—William Aylor

(57) ABSTRACT

A method of making a liquid fuel from agricultural waste which may be animal manure, includes admixing agricultural waste with at least one material selected from the group consisting of hydrogen gas and water, at elevated pressure heating a mixture to about 300° C. to 400° C. for a predetermined time, subsequently cooling the mixture, and subsequently separating gas from liquid. The process produces a liquid fuel having a high heating BTU value per pound of fuel. The water preferably functions as both a solvent and the hydrogen donor for said agricultural waste. Corresponding apparatus is provided.

7 Claims, 3 Drawing Sheets

METHOD OF CONVERTING AGRICULTURAL WASTE TO LIQUID FUEL CELL AND ASSOCIATED APPARATUS

CROSS REFERENCE TO RELATED APPLICATION

This application claims the benefit of U.S. Provisional Application Ser. No. 60/191,531, filed Mar. 23, 2000.

BACKGROUND OF THE INVENTION

1. Field of the Invention

The present invention relates to improved methods and associated apparatus for conversion of agricultural waste to a liquid fuel and, more specifically, it relates to such conversion processes and associated apparatus which will facilitate economical on-site conversion.

2. Description of the Prior Art

Both energy needs and environmental considerations have resulted in many efforts over many decades to provide alternative sources of fuel which would satisfy both objectives. To date, in addition to the conventional fossil fuel sources and the use of nuclear energy, numerous approaches have been taken, including, for example, unique energy sources, such as the wind, or mechanical or thermal use of large bodies of water. Also, with respect to environmental considerations, focus on use of low sulfur coal and/or means for cleaning exhaust from such uses as utilities have been known.

The U.S. Department of Energy is faced with the immense task of balancing energy demand of our society with environmental consequences of generating that energy. The primary focus has been on the efficiency of conversion of fuel to a useful form of energy. Energy can simply be defined as the ability to do work. The energy value of a fuel normally is measured by temperature change and fundamentally fuels are valued by their ability to supply heat. In the traditional sense, some combustion process produces heat from the fuel. As fuel is oxidized, heat is released. The heat is converted through some mechanical means to a more useful form for application to society. The greater the efficiency of that conversion the more energy efficient we become and the less impact on the environment.

It has been suggested to convert agricultural and biological waste such as sawdust and various manures to liquid fuels and subsequently to energy (see Stiller et al., *Fuel Processing Technology* 49, 167, 1996 and Dadyburjor et al., *Paper presented at 209th National Meeting, American Chemical Society*, Anaheim, Calif., April, 1995). The project investigated the effects of recycling "waste" materials by using them as co-liquefaction agents for the conversion of coal to liquid fuels has been considered. See, for example the used shredded tires (see Sharma et al., *Energy and Fuels* 12, 589, 1998), plastic materials, such as polyvinyl chloride, (see Zondlo, J. W., *Paper presented at 214th National Meeting, American Chemical Society*, Las Vegas, Nev., September, 1997) and high density polyethylene, (see Dadyburjor, D. B., *Paper presented at the Tri-State Catalysis Society Spring Symposium*, Charleston, W.Va., April, 1998), as well as the ag- and bio-wastes.

In an effort to improve the coal liquefaction process, it was hypothesized that organics with conjugated double bonds that are plentiful in manures and other agricultural wastes would catalyze coal liquefaction reactions. In testing the hypothesis, it was found that the wastes did not improve the conversion of coal to liquid fuel, but the organic matter of the wastes were converted completely to fuel.

Coal is not a necessary prerequisite for fuel production from manures. Stiller et al., *Co-processing of Agricultural and Biomass Waste With Coal, Fuel Processing Technology*, In Press, 1996 indicates that one can produce fuel with good yields using the manure alone, along with an iron-based catalyst, and then the manure can be done almost independent of the manure source.

The present invention focuses on the use of agricultural waste, such as animal manure, for example, as a source of material from which to produce liquid fuel. (See, Stiller et al., *Fuel Processing Technology* 49, 167, 1996.)

SUMMARY OF THE INVENTION

The present invention provides a method of making a liquid fuel from an agricultural waste which may be animal manure or other materials. It involves mixing of the agricultural waste with a predetermined quantity of a source of hydrogen for hydrogenation and may be hydrogen gas, or water, or both. The mixture is heated to a preferred temperature of about 300° to 400° C. for about 15 to 90 minutes at a desired pressure followed by cooling and removing gas, followed by removing of the liquid fuel from the reactor. The water, if employed, is preferably mixed with the agricultural waste in an amount of at least 50 percent by weight supercritical water to the weight of the agricultural waste.

A catalyst may be employed to enhance the efficiency of the process. In a preferred form, the agricultural waste may be dry before introducing it into the reactor. The water preferably is at about supercritical temperature and serves as both a solvent and a hydrogen donor for the agricultural waste.

Ash, which may be employed as a fertilizer, may be a byproduct of the process.

The apparatus may include a hydrogenating gas source and/or a water source, an agricultural waste source and a pressurizer vessel for providing a pressurized environment for the mixture of agricultural waste and gas and/or water. A reactor containing the mixture is subjected to elevated pressure and heated to a desired temperature for a predetermined period of time after which a cooler serves to cool the mixture and the separator serves to separate it into gas and other components.

It is an object of the present invention to provide a method and associated apparatus for conversion of agricultural waste into a usable liquid fuel product.

It is a further object of the present invention to provide such a system which may employ animal manure as the agricultural waste.

It is another object of the present invention to provide such a system which may economically be performed on a farm thereby eliminating the need to transport the agricultural waste great distances to a processing facility.

It is a further object of the present invention to provide such a fuel while minimizing otherwise present environmental hazards and eliminating undesirable manure odors.

It is a further object of the present invention to provide a system for creating liquid fuel from animal manure which will greatly enhance the energy value of the original manure.

It is a further object of the present invention to provide such a system which will facilitate generation on a farm of fuel for use on the farm for purposes such as generation of electricity or, in the alternative, if desired, for the fuel to be transported to the central refinery unit for conversion into petroleum-like fuels.

It is yet another object of the invention to convert the biomass mixture of agricultural waste and hydrogen gas or water (preferably at about supercritical temperature or both)

in such a fashion that the water contained in the biomass would serve as a hydrogen donor for hydrogenating the biomass carbon in order to dehydrate the fuel.

It is yet another object of the present invention to provide such a system which produces an ash byproduct which is suitable for use as a fertilizer.

These and other objects of the invention will be more fully understood from the following description of the invention with reference to the drawings appended hereto.

DESCRIPTION OF THE PREFERRED EMBODIMENTS

Figures 1A, 1B, 1C:
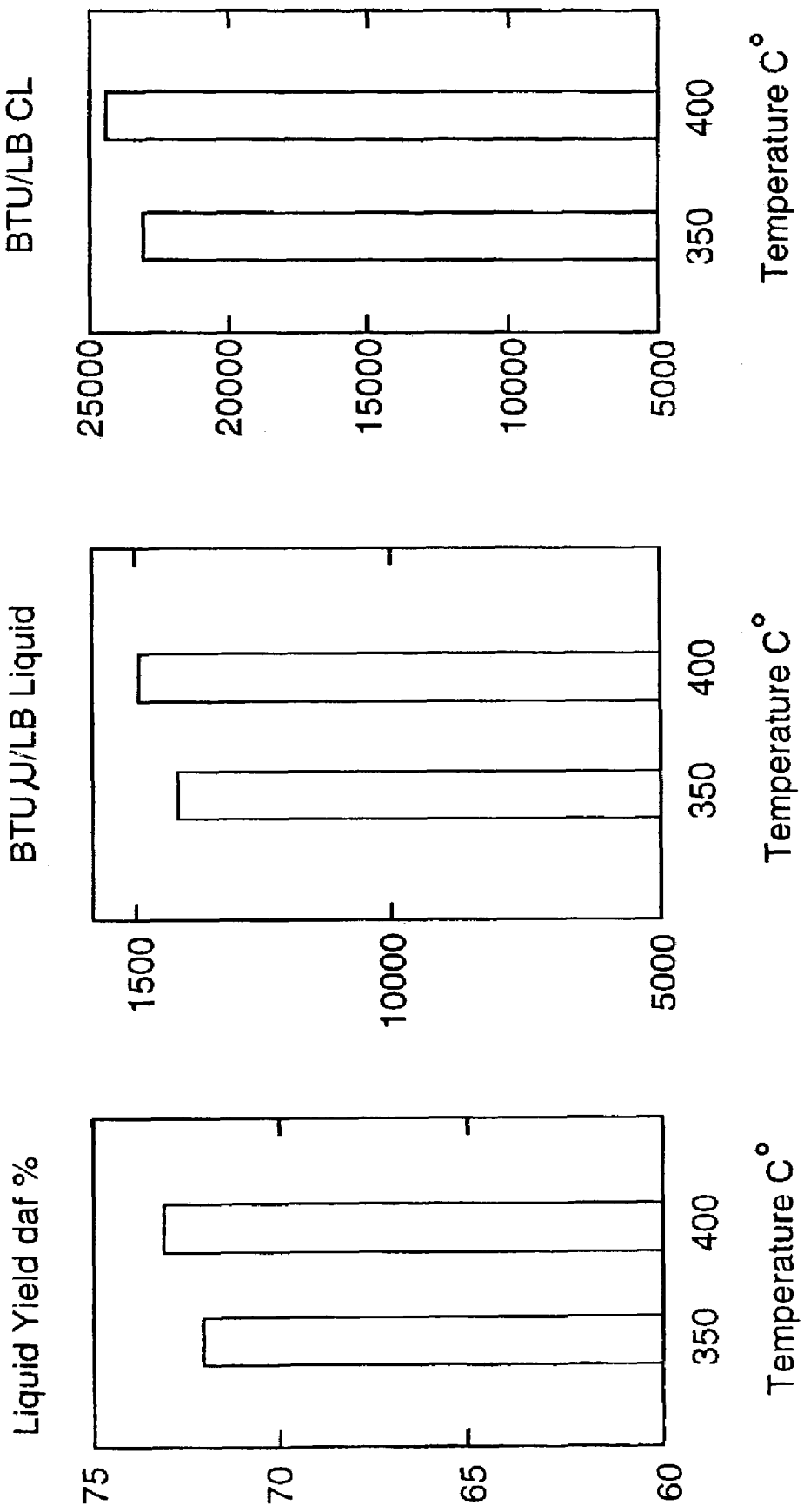
FIG. 1 shows the effect of temperature on yield and heating value of a liquid fuel product produced from a reaction performed at 100 psi.

As employed herein, a reference to weight percent, unless otherwise expressly stated in a specific context, shall refer to weight percent of a particular constituent as a percentage of a dried or dehydrated agricultural waste material or animal manure material.

As employed herein, the term "animal manure" shall mean non-human fecal matter from animals of the type that may be raised on a farm or in a zoo and shall expressly include, but not be limited to, hog manure, cattle manure and poultry litter.

As employed herein, the term "agricultural waste" shall expressly include, but not be limited to, animal manure, sewage, sludge, human waste, crop residues, sawdust, corn stover, soybean stover, and straw.

As employed herein, the terms "supercritical water" or "water at about supercritical temperature" shall refer to water at or above supercritical temperature and water within several degrees of, but below supercritical temperature.

The present invention employs animal manure as a substrate for catalytic liquefaction, i.e., can be converted to fuel suitable for use in diesel engines with the use of a low-cost (disposable) catalyst. This conversion will eliminate objectionable manure odors, retain the original fertilizer value in a form that can be economically transported, if necessary, and provide adequate fuel to provide electricity for the farm.

Manure is a byproduct of hog production that is both an asset and a liability. The asset is its value as a fertilizer. The liabilities are the odor and the water pollution problems. Converting the manure into fuel will eliminate the problems. The fertilizer value will be retained in the residue and vapors of the conversion process. In concentrated production facilities, disposal will be eliminated. The surplus fuel and fertilizer produced can be marketed profitably.

It has been suggested to convert coal to liquid fuels, using a low-cost, iron-based catalyst (Dadyburjor et al., *Use of an Aerosol Technique to Prepare Iron-Sulfide-Based Catalysts for Direct Coal Liquefaction*, Chapter 19 in *Advanced Catalysts and Nanostructured Materials: Modern Synthetic Methods*, W. R. Moser, editor, *Academic Press*, New York, 1996), and also in the catalytic co-liquefaction of coal with waste materials (Liu et al., *Coal/Tire Co-liquefaction Using an Iron-Sulfide Catalyst Impregnated In-situ in the Coal Energy and Fuels* 9(4), 673, 1996). The catalyst is obtained by the controlled disproportionation of ferric sulfide to form a pyretic structure and a nonstoichiometric pyrrhotitic structure in intimate contact. Runs by an independent federal laboratory (Stohl et al., *Evaluation of West Virginia University's Iron Catalyst Impregnated on Coal, Proc. Coal Liquefaction and Gas Conversion Contractors Review Conference, USDOEE*, Pittsburgh, Pa., p.679, 1996) have verified that this catalyst is the most effective of the iron-based catalysts among those funded by the US Department of Energy. Preliminary studies (Stiller et al., *Co-processing of Agricultural and Biomass Waste With Coal, Fuel Processing Technology*, In Press, 1996) indicate that it is possible to co-liquefy biomass as well as various types of agricultural manures along with coal and this catalyst to form a fuel.

The poultry industry generates huge quantities of litter annually. Currently, some of the poultry litter is used as a fertilizer, and another portion is used as a constituent of feed provided to beef cows. However, there is not enough farm land area in the region to use all the litter as fertilizer. Alternative methods of disposal of agricultural wastes are needed. The present invention uses poultry litter and other agricultural wastes as feedstock for liquefaction. Historically, liquefaction is a process that has been used to convert coal to liquid fuels. Poultry producers would carefully harvest litter for the conversion process. Therefore, storage of litter and the associated loss of litter in runoff would be minimized. Further, legislation is likely to be introduced that could outlaw the use of poultry litter as a feed. Accordingly, improperly managed litter and excess litter could find itself in the waters. Improper management of the litter pollutes the waters with disease-causing bacteria and nutrients which could severely strain water-treatment facilities. Current strategy used to solve this problem is to spread the litter over a wider area. The net effect is that the problem is not solved, but only diluted.

The scope of the problem is well defined. It is imperative to both manage the poultry litter in a non-polluting fashion, and to manage all of the poultry litter. A paradigm shift will be necessary to achieve this. The present invention will not only meet these two requirements, but will also generate energy from the poultry litter. Depending on the relative economics of capital equipment purchases and transport costs for poultry litter, the energy could be generated either at a central station or decentralized to each poultry farm.

As poultry litter in its natural state is a slurry of variable water content, our sample poultry litter will be dried until no moisture is detectable, and then a fixed amount of water will be added. The relative amount of water will be the economically optimum content of water in the feedstock to the commercial reactor. The catalysts used will be relatively cheap materials, and environmentally benign, so that catalyst recovery is not an economic or environmental issue. A preferred catalyst is an iron-sulfide-based disproportionate catalyst. Typical loadings of catalysts are 1-2% by weight of the agricultural waste.

Although poultry litter has value as fertilizer, poultry producers do not own enough land to use all the litter as fertilizer in an environmentally safe manner. Disposal of all litter as fertilizer would require uniform and judicious application to all the land that is tilled and used for pastures in the region (National Agricultural Statistics Service, 1997). As a result, the total amount of poultry litter and wastes from other animals exceeds the amount that can be used as fertilizer.

While other manures can be used as substrates, hog manure is among the preferred for the present invention for the following reasons. Manure from the hog industry is, for the most part, harvestable. Being harvestable is critical for the conversion to fuel, but makes the manure a liability in spite of its value as fertilizer. Storing the manure at a central location and occasional spreading on fields generates odor problems that our society is not willing to tolerate. Thus the hog industry generates manure as a byproduct that desperately needs an alternative use. There are many hog production units, generating adequate quantities of manure to make it cost effective to convert the manure to fuel. Most of these production units also have a use for the fuel, produced, thereby eliminating the need to develop a new marketing system for the fuel to make the process work. For example, corn or soybean stover were also converted to fuel, then a grower-feeder could generate much more fuel than needed on the farm, and a fuel marketing system would almost certainly develop, perhaps similar to milk pickup, after the technology already was on the farm.

While useful, it is more difficult to establish the technology in the cattle industries. Cattle produce much more manure than hogs, but only a small fraction of it is harvestable. Most of the manure that is harvestable is from cattle that are fed purchased feed, resulting in reduced need on-site for the fuel produced. There would, therefore, be greater need for fuel produced by the present invention to be sold. For the fuel to be of any value, it must be sold. Hence, for the cattle industry, the initial fuel marketing is much more important for this process to be of value than it is for the pork industry. With regard to poultry manure, although most is harvestable, it has some of the same drawbacks as cattle manure. Also, poultry manure also has value as a cattle feed.

In the present invention, agricultural waste and, preferably, animal manure is efficiently converted to a fuel with usable byproducts. In a first embodiment of the invention, which will be described herein in connection with FIG. 1, the source of hydrogen for hydrogenation of the agricultural waste is hydrogen gas which is introduced into the reactor without requiring the addition of water. In a second embodiment of the invention, water, which may be about the temperature of supercritical water or above, may be employed as both a solvent and a hydrogen donor without requiring the use of hydrogen gas. In a third embodiment, both hydrogen gas and water may be employed as hydrogen donors.

Among the important parameters of the product are: the liquid yield (in terms of the dry, ash-free [daf] poultry litter feedstock); and the heat content (BTU/lb liquid product and BTU/lb poultry litter). Some preliminary data are shown in FIG. 1. Conditions here are relatively mild, except perhaps for the pressure (100 psi hydrogen). Nevertheless, liquid yields are well above 70 weight percent. One pound of poultry litter generated fuel has a heating value of over 22,000 BTU/lb. The dashed lines at the bottom of two of the bar graphs indicate the heating value of one pound of dry poultry litter—approximately 7,000 BTU/lb.

The reaction conditions of the present invention employed to convert the manures to fuel are less rigorous and less expensive then the conditions necessary for liquefaction of coal. The only reactants required are the manures and, in a first embodiment, low pressure hydrogen gas, in a second embodiment, water, and, in a third embodiment, low pressure hydrogen gas and water. The fuel recovered from the reactor in the second embodiment, for example, contained nearly twice the energy value of the original manure (4000 kcal/g vs. 7500 to 7900 kcal/g).

In performing the following experiments, the primary focus was placed on certain reaction conditions. The reaction conditions in question refer to the temperature, pressure, gas composition, reaction time and the amount and type of catalyst, if any, to be used. The parameters found to be the most sensitive to changes, are systematically altered for optimization. These parameters are the temperature, the reaction time and the amount of catalyst. In the second embodiment of the invention, hydrogen gas, which can be rather expensive, is not employed and water is employed as the reactant and hydrogen donor. A statistically designed set of experiments were carried out, where these parameters were systematically varied. In this way, optimal conditions for these parameters can be determined without carrying out runs at all combinations of all the parameters.

All the reactant used was taken from the same sample of hog manure. The sample was sufficiently large that uniform properties can be assured. The properties of interest include the content of water, ash, lignin, cellulose, hemi-cellulose, and energy content. The properties of the sample were characterized prior to the runs. In a typical run, the reactant and catalyst were placed in a high-pressure batch reactor which is then pressurized to the required pressure and composition. The reactor will then be placed in a specially designed vertical agitator to ensure good mixing during reaction and fully immersed in a fluidized sand bath pre-heated to the desired temperature of reaction.

After the reaction time passed, the reactor was removed from the sandbath. The vapor-phase contents of the reactor were quantitatively analyzed by gas chromatography. Major components of the vapor phase included hydrogen sulfide, ammonia and light hydrocarbons like ethane. Finally, the solid and liquid products in the reactor were analyzed by selective dissolution. Currently, solubility in tetrahydrofuran (THF) is used to characterize the overall conversion of the reactant, the oil component of the product is defined as that which is soluble in hexane, while the asphaltene fraction is soluble in tetrahydrofuran but insoluble in hexane.

The present invention provides technology capable of generating liquid-fuel products, and hence energy, from agricultural waste, preferably animal manure. It involves conditions such as temperature, pressure, water content, gas-phase atmosphere and catalyst to obtain optimum parameters for achieving the maximum yield of high-quality liquid fuel. The reactor systems are easily manufactured, may be optimized for different animals and different animal management systems, and can be easily operated on a farm or elsewhere to produce the required fuels.

In one embodiment of the present invention, after the feedstock is loaded into the reactor, the air will be replaced with the gas-phase mixture, which may be hydrogen, at the pressure of interest. The tube reactor may be designed for pressures of the gas as high as 1000 psi at room temperature, though, in the first embodiment, we use values around 100 psi. The reactor will then be clamped to a vibration apparatus and lowered into a fluidized sand bath operated such that the reactor temperature rapidly approaches the reaction temperature, typically around 350° to 400° C.

After the desired time period, generally about 15 to 90 min., the reactor will be raised from the sand bath and removed from the vibration apparatus. The reactor will be cooled to room temperature, after which the gas contents will be removed to an evacuated glass bulb of known volume. Aliquots will be injected into a gas chromatograph, to determine the gas composition quantitatively. The remaining contents of the reactor will then be washed with excess tetrahydrofuran (THF). This dissolves the fuel products, and the weight of the residue after filtration will allow us to determine the conversion of the feedstock. The THF will be removed by a rotary evaporator. The remaining material (the fuel product) will then be analyzed (for lignin and the like) and tested for boiling point and heating value. The fuel product and the non-fuel residue from the reactor may be analyzed. C, H, N, S may be analyzed by any suitable means known to those skilled in the art and the elemental composition of the inorganic fraction may be analyzed by means well known to those skilled in the art, such as spectroscopy, for example.

The presently preferred property ranges of temperatures of about 300 to 400° C.; pressures of about 15 to 150 psia hydrogen gas at room temperature; reaction times of about 15 to 90 min.; atmospheres—nitrogen, helium, and hydrogen; catalysts such as ferric sulfide, multi-metal sulfides; catalyst loading of about 0 to 2 weight percent; and feedstock water content from about 0 to 50 weight percent agricultural waste. In the first embodiment, the water will be at or near zero, and, in another embodiment, water is present along with the hydrogen gas in water amounts of about 50 to 80 weight percent with higher pressure in the reactor. In yet another embodiment, water in an amount of less than 50 weight percent will be used as the primary or sole source of hydrogenation material without the use of hydrogen for this purpose.

Based on these results, farm-scale reactors may be designed and built to accommodate the various wastes.

Water at about supercritical temperature is a preferred reactant in the present invention. Biomass (agricultural waste) in its natural form is an excellent feedstock for the process. Exposing biomass with water to controlled heat and pressure causes water to become a hydrogen donor to the biomass. Oxygen and some $CO_2$ are released but the majority of the biomass carbon remains as short-chain hydrocarbon. The hydrocarbon material generated has a fuel value of at least about 15,000 BTU/pound of fuel. This is approximately midway between that of coal and diesel fuel. The sulfur content of the hydrocarbon is very low. Most of the sulfur in biomass is present as sulfhydryls and thiols. The sulfur probably is reduced to $H_2S$ in the process. Likewise, most nitrogen is present in biomass as primary amines. These amines are likely to be reduced to ammonia. Ammonia and $H_2S$ can be "scrubbed" easily from the effluent gases and returned to the soil as nutrients for plants without an atmospheric phase. The hydrocarbon will be very low in N and S Also, $CO_2$ released from combustion of the hydrocarbon is not generating additional greenhouse gas to the atmosphere because it originated as $CO_2$ fixed by photosynthesis, generally within the same year.

Ruminant animal manure, an extreme challenge for other technologies to convert to an effective fuel, is an excellent feedstock for the conversion process of the present invention. The present invention can convert all organic matter of ruminant manure to fuel with a 75% efficiency. Ethanol production from ruminant animal manure is virtually nil and methane generation will recover only about 15% of the original energy in the form of methane with 60-70% of the original substrate unreacted. The present invention would not preclude ethanol or methane generation. There are situations where ethanol or methane is the most desirable form of fuel. The process would be useful to convert the residue of ethanol or methane generation into fuel.

The bulkiness of agricultural waste makes transport inefficient and carrying agricultural waste off the farm increases the potential for exposure to biohazards. The proposed process of the present invention does not contribute to accumulation of greenhouse gases. The $CO_2$ generated from burning the fuel originated from the atmosphere. If the carbon cycle were to be disrupted, atmospheric $CO_2$ would be depleted within 20 years to the point where photosynthesis would not be possible.

The lignin portion of the agri-waste has the ideal molecular structure for liquefaction, but traditional liquefaction requires hydrogen investment. The cost for hydrogen limits the potential for traditional liquefaction. The direct liquefaction of agri-waste does not require traditional processes. The present invention has shown that agri-waste can be reacted in super-critical water. In this state, supercritical water acts not only as a solvent, but as a reactant. Portions of organic molecules are driven to react with the supercritical water and produce $CO_2$. The hydrogen part of water is then free to react with the cleaved portion of the organic molecule from which the oxidized carbon was released. The oxygen part of the water is used to further oxidize the partially oxidized part of the molecule. The molecule breaks and the fragments are capped with the hydrogen part of the water. Large molecules are reduced in dimension and become hydrogenated as gas is released simultaneously. The major component of the gas is $CO_2$.

Figure 2:
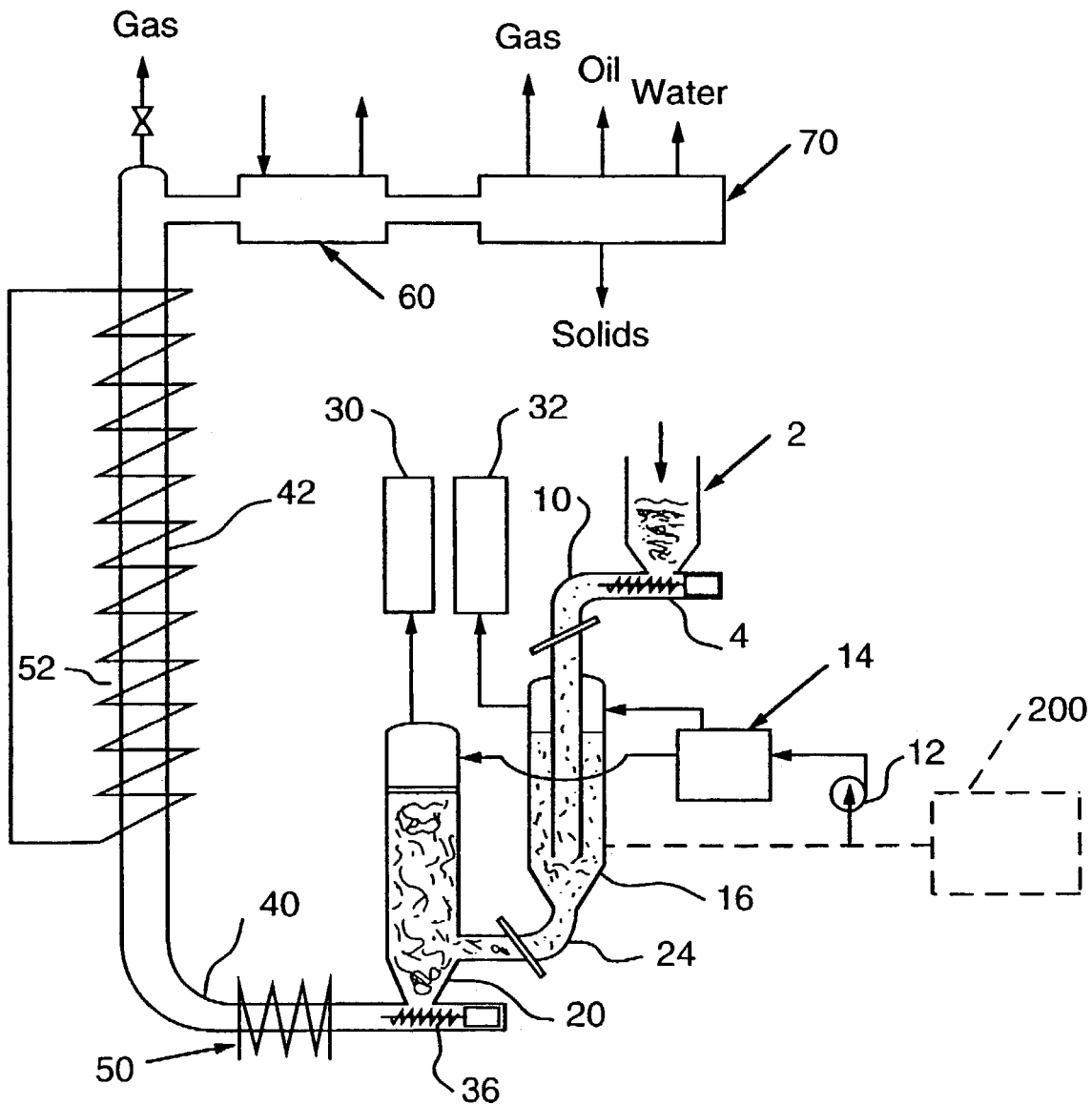
FIGS. 2 and 3 are schematic illustrations of alternate forms of apparatus usable in the present invention.

Referring now to FIG. 2, there is shown a hopper 2 wherein the agricultural waste is introduced into the apparatus. A suitable conveyor 4 is disposed within conduit 10. A source of water 12, which is, preferably, supercritical water, provides a supply of the water to high pressure reservoir 14 from which it is introduced into initial pressurizer 16 wherein the water is admixed with the agricultural waste which is introduced through hopper 2. The final or second pressurizer 20 receives the admixed agricultural waste and supercritical water through duct 24. Water dump tanks 30, 32 serve to receive excess water from the respective pressurizer 16, 20. A suitable conveyor 36 transports the water/agricultural waste mix through duct 40 to reactor 42. In the form shown, the admixed water and agricultural waste which is preferably at a pressure of about 15 to 150 psia is subjected to heating through external electrical heaters 50, 52 to a temperature of about 300° to 400° C. and is maintained at that temperature for about 15 to 90 minutes. The elevated temperature mix is then passed through cooler 60 in order to reduce the temperature of the mixture to about ambient temperature. In the form shown, a portion of the gas, which results from the reaction, may be withdrawn through valve 64.

It will be appreciated that the supercritical water serves not only as solvent for the agricultural waste but as a hydrogen donor in effecting hydrogenation of the agricultural waste.

After emerging from the cooler 60 enters separator 70 wherein gas which depending upon the nature of the agricultural waste may include $CO_2$ and hydrocarbons, water, solids which may include ash suitable for use in fertilizer and the liquid fuel designated oil emerge. Suitable means well known to those skilled in the art for separating the solids from the other materials.

Figure 3:
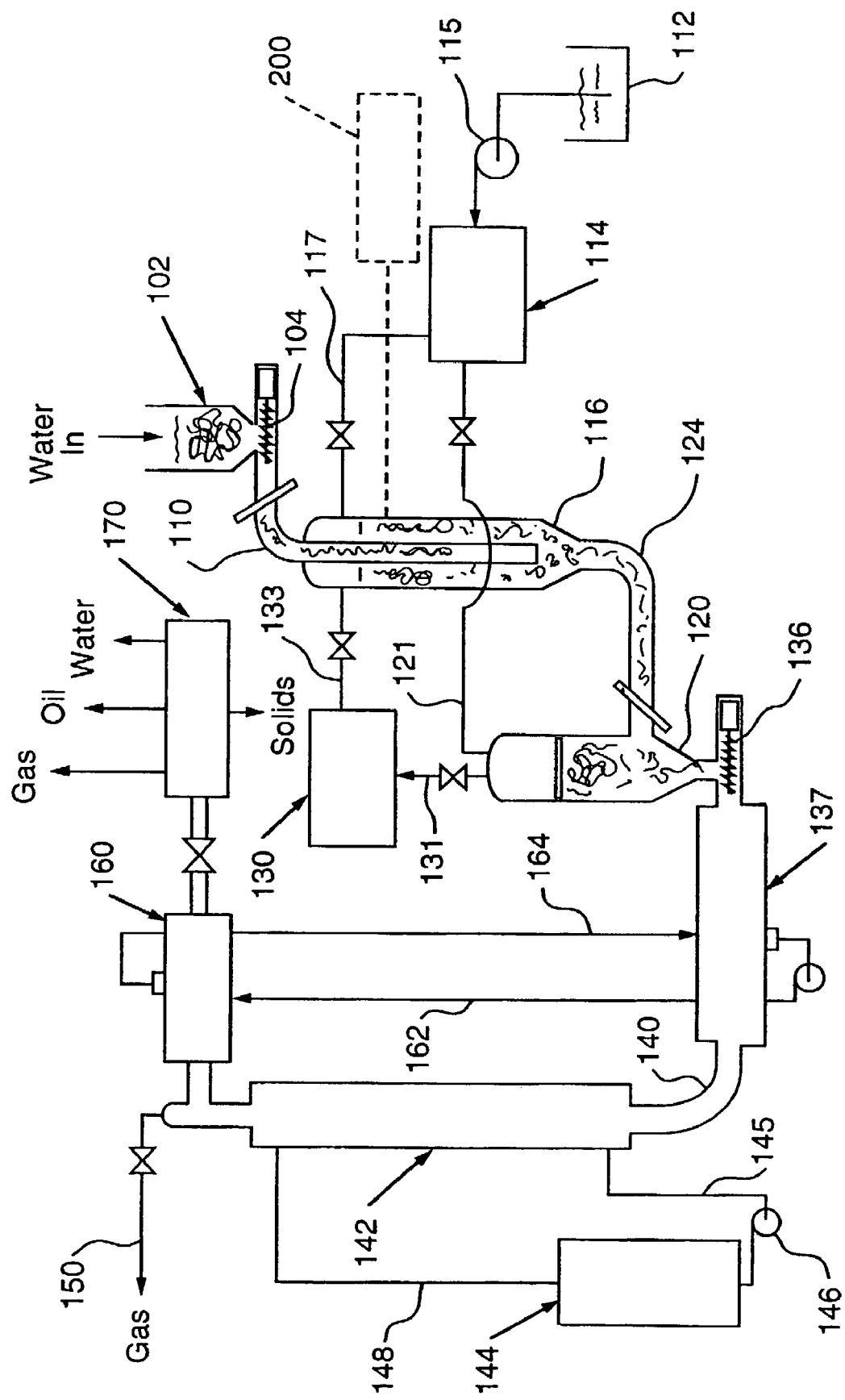

Referring to FIG. 3, a modified version of the apparatus of the present invention will be considered. A waste in hopper 102, which receives the agricultural waste which will preferably be animal manure, is introduced into the duct 110 and moved therein by means of conveyor 104. A water source 112 provides water to high pressure reservoir 114 by means of pump 115 with the reservoir supplying water to the initial pressurizer 116 through pipe 117 and to the final pressurizer 120 through pipe 121. The agricultural waste and supercritical water are admixed in initial pressurizer 16 and delivered by way of conduit 124 to final pressurizer 120. Access water is introduced into the second water reservoir 130 through pipes 131, 133, if desired. The -pressurized mixture of agricultural waste and supercritical water emerging from final pressurizer 120 is moved under the influence of conveyor 136 into a preheated condenser 137 where the temperature is elevated after which the mixture passes through conduit 140 into reactor 142 with a heater 144 serving to circulate heating water 144 through pipe 145 by pump 146 into reactor 142 and to return water from reactor 142 to heater 144 through pipe 148. Gas may be withdrawn by valve 150 from the upper end of the reactor and the mixture then passes to cooler 160 which is in heat exchanging relationship to preheater 137 through pipes 162, 164. The cooled material, which is cooled to about room temperature, is then delivered to separator 170 for separation of gas and the solids, oil and water which are properly delivered to the desired location. The same pressure temperature and time relationships may be employed in this embodiment as in the embodiment of FIG. 2. The fuel may be burned in the crude form on the farm to generate electricity.

Shown in dashed lines, designated by reference number 200 in FIGS. 2 and 3, is the alternate embodiment, wherein block 200 represents a source of hydrogen gas which may be, in one embodiment, used alone as the source of hydrogen in the present process or, in the second embodiment, provided in combination with the water from sources 14, 114 in practicing another embodiment of the invention.

Reactions were carried out is tubing bombs. A blend of manure (chicken litter, hog manure, dairy manure, sewage sludge) and water was mixed. A sample of the blend was enclosed in a tubing bomb and immersed in a fluidized bed at 400° C. The bomb was shaken to reduce transport limitations. After 30 minutes the bomb was recovered and quenched. An appreciable quantity of gas was generated. The gas composition was primarily $CO_2$, but there were also some sulfur containing compounds in the gas stream. The contents of the bomb were emptied and separated by solvent separation as in the normal manner for coal liquefaction. The major component was light oil. The heating value of that oil was measured to be 16,500 BTU/lb of fuel. This experiment was repeated with cow manure and pig manure with similar results. It appeared that about 70% of the weight of the manure was converted to this light oil. A significant quantity of water was consumed by the reaction.

The present invention involves a reaction that converts biomass into an energy-dense fuel. Biomass, such as livestock manure, crop residues, sawdust, and sewage sludge react with supercritical water to generate hydrocarbons, oxygen, and carbon dioxide. The hydrocarbons contain approximately 15,000 BTU/lb compared to approximately 6,000 BTU/lb (dry wt basis) of the biomass feedstock and 18,000 BTU/lb diesel fuel. Not only does the reaction convert biomass to a more energy-dense fuel, it uses the water contained in the biomass as the hydrogen donor for hydrogenating the biomass carbon; in effect dehydrating the fuel. The reaction, therefore, overcomes the two limiting factors of using biomass as a fuel: low energy density and high moisture content.

The technology permits most of the fuel produced from the agricultural waste (biomass) to be converted on-site to electricity.

There are few byproducts from the reaction. The ash component of the feedstock does not react and would be available as a biohazard-free fertilizer. The high-density fuel is low in sulfur and nitrogen. This makes a clean-burning fuel. The sulfur and nitrogen in the feedstock probably are reduced to sulfides and ammonia, respectively, and released in the gas phase. The sulfides could be burned as fuel for the reactor or generator and the gases scrubbed with water to trap the sulfur as sulfates. The sulfates could be used to trap ammonia. The ammonium sulfate could be used as a fertilizer.

Agricultural wastes are continuously available sources of carbon-containing chemicals that are potential fuel precursors. These fuel precursors are generated on farms in the form of litter, manure, straw, stover, etc. These precursors are derived by photosynthesis, which uses atmospheric $CO_2$ for its substrate. The conversion of these wastes into fuels with the subsequent burning of the fuel, therefore, recycles $CO_2$ rather than generates it. Inability to convert this waste into environmentally benign materials limits the growth of the agricultural industry in the eastern portion of the United States Newspaper headlines have emphasized the effects of chicken litter on the Chesapeake Bay. North Carolina placed a moratorium on expansion of hog production because of the negative effects of large waste lagoons on the environment.

The objective of the present invention is to produce high-BTU, liquid fuels from agricultural wastes. Poultry litter, dairy manure hog manure, and sewage sludge reacts with supercritical water to produce a high-BTU fuel. The products of this reaction can be divided into three components (1) an oil-like material with a heating value of about 16,000 BTU/lb (2) a char-like material with a heating value of about 12,000 BTU/lb, (3) a gas which is mostly $CO_2$. All the ash material is contained in the char or is solubilized in the excess, nonreacted water.

While it is preferred for certain embodiments to employ a suitable catalyst, such use is not essential.

It will be appreciated that the present invention has provided methods and apparatus for convert agricultural waste, such as animal manure, into a usable fuel in an efficient, economical manner. In one embodiment, hydrogen gas is admixed with agricultural waste and processed in accordance with the present invention. In another embodiment, water is admixed with agricultural waste for such processing, and, in a third embodiment, both hydrogen gas and water are admixed with the agricultural waste for such processing. When water is used, it is preferred, but not necessary that it be supercritical water, with the water serving both as a reactant and a source of hydrogen.

Whereas particular embodiments have been described herein for purposes of illustration, it will be evident to those skilled in the art that numerous variations of the details may be made without departing from the invention as defined in the appended claims.

The invention claimed is:

1. A method of making a liquid fuel from agricultural animal waste comprising admixing said agricultural animal waste with hydrogen gas in a closed reactor at a pressure of about 15 to about 150 psia, heating said mixture to a temperature of about 300° degrees to 400° degrees C. for about 15 to 90 minutes, cooling said mixture, and removing gas and liquid fuel from said reactor.

2. The method of claim 1 further comprising admixing said agricultural waste with hydrogen gas and water.

3. The method of claim 2 wherein said water is admixed in an amount of 50 to 80 weight percent of the amount of agricultural animal waste.

4. The method of claim 1 wherein said agricultural waste is animal manure.

5. The method of claim 2 wherein said agricultural waste is animal manure.

6. The method of claim 3 wherein said agricultural waste is animal manure.

7. The method of claim 1 wherein said temperature range is about 350° C. to 400° C.

* * * * *